United States Patent Office 3,411,953
Patented Nov. 19, 1968

3,411,953
METHOD OF PRODUCING A FUEL CELL ELECTRODE CONTAINING A NICKEL-PHOSPHORUS ALLOY AS THE CATALYST
Theodore L. Larson, Milwaukee, and James P. Murdock, West Allis, Wis., assignors to Allis-Chalmers Manufacturing Company, Milwaukee, Wis.
No Drawing. Filed Feb. 5, 1965, Ser. No. 430,726
6 Claims. (Cl. 136—120)

ABSTRACT OF THE DISCLOSURE

A method of producing a catalytic fuel cell electrode whereby a fluocculent nickel phosphorus alloy is precipitated with an alkali hypophosphite from an ammonium hydroxide solution containing a dissolved nickelous salt and a dissolved alkali pyrophosphate, and forming the flocculent nickel phosphorus alloy into an electrode.

---

This invention relates to improved anode catalysts for activating fuel half-cell deactions within fuel cells. More particularly, this invention deals with fuel cell anodes comprising mixtures of nickel with nickel phosphorus alloys that electrochemically activate fuel cell fuels such as hydrogen, hydrazine, ammonia; and alcohols, esters, carboxylates, hydrocarbons, and carbonyl compounds of up to about 14 carbon atoms.

The term fuel cell, as used herein, refers to those electrochemical devices that convert the free energy of a chemical reaction directly to electrical energy. Such devices are well known in the art and although there are differences between various cells, a discussion of some of their common characteristics will aid in the understanding of our invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel, that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrloyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, in cells operated at less than about 95° C., a catalyst is necessarily employed to bring the reactants to an activated state. The energy input required to reach an activated state, i.e. heat of activation, partly determines the speed of reaction. Through a mechanistic bypass a catalyst brings about reaction with a smaller heat of activation.

Nickel electrodes have found extensive use as anodes in fuel cells having a caustic electrolyte. In so-called low temperature operation efficiency demands that the porous nickel electrode base carry a deposit of a catalyst such, for example, as platinum group metals and oxides of the transition series elements upon its surface.

We have now discovered that when the electrode comprises, in addition to the nickel substrate, a nickel phosphorus alloy, the output generated at our novel electrode exceeds that obtained when only nickel alone is used.

Hence, the general object of our invention is the provision of a catalytic fuel cell electrode.

A further object of our invention is to provide a method of obtaining a mixture of nickel together with nickel phosphorus alloys for fabrication into our novel fuel cell electrodes.

A still further object of our invention is to obtain a high surface area nickel catalyst for use as fuel cell electrodes that has an improved output compared to previously existing nickel electrodes.

The methods by means of which the above objects are attained comprise first obtaining the catalytic mixture of nickel-nickel phosphorus alloy, hereinafter referred to as the catalytic material.

We have discovered that the catalytic material can best be obtained by reducing our catalytic material from an aqueous solution comprising a reducible source of nickel; a condensed polyphosphate that complexes nickel ions ($Ni^{++}$) in aqueous solution; and an alkali hypophosphite. In addition, the pH of this solution ought constantly to be controlled so as to be above 10 and preferably in the pH range of 10 to 12. To achieve control, sufficient hydroxyl ions are added as an alkali hydroxide, or better yet, as ammonium hydroxide.

As a source of reducible nickel, any water soluble nickelous salt is suitable provided its anion does not interfere with the nickel reduction by itself either precipitating or undergoing a redox reaction. We find that nickel sulfate works well.

The nickel ions are reduced by the alkali hypophosphite according to the following reaction:

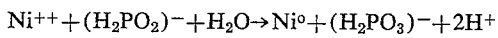

Simultaneously, some of the hypophosphite is decomposed. This decomposition is catalyzed by presence of the freshly reduced nickel and proceeds as follows:

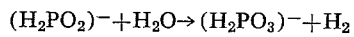

Therefore, the necessity of providing an excess of hypophosphite over and above that stoichiometrically required to reduce all the Ni to $Ni^0$ is apparent. If insufficient hypophosphite is provided, no harm is done except that not all the nickel will be reduced.

We find that if 2.75 moles of $(H_2PO_2)^-$ are present per mole of $Ni^{++}$ the reaction can proceed to completely deplete the solution of $Ni^{++}$.

The function of the condensed phosphate is to complex the nickel so that precipitation of basic nickel salts is prevented when the pH is adjusted upward by the addition of hydroxyl ion. Therefore, to this end, any condensed polyphosphate that performs the complexing function is suitable. Whatever condensed polyphosphate is used, it should be present in an amount sufficient to complex all the $Ni^{++}$ present and prevent the precipitation of basic nickel salts.

When alkali pyrophosphate is used as the complexing agent, an amount of at least 1.00 mole of $P_2O_7^{--}$ for each 1.45 moles of $Ni^{++}$ is deemed the minimum pyrophosphate required for successful complexing of the nickel. Preferably 1.18 mole $P_2O_7^{--}$ is present for each 1.00 mole $Ni^{++}$. While pyrophosphates can of course hydrolyze and form orthophosphates, this is not material to the performance of the process, because the nickel is reduced before the relatively slow hydrolysis becomes a serious problem.

Turning now to a specific example of the practice of our invention, we shall outline the production of a batch of our catalyst. An aqueous solution having the following composition was prepared:

50 g., $Na_4P_2O_7.10H_2O$; 25 g., $NiSO_4.6H_2O$; 25 g., $NaH_2PO_2.H_2O$, and per liter of water, together with sufficient $NH_4OH$ to continually produce a pH of at least 10.

This solution was heated to 62° C. and seeded with 0.05 gram/liter of Pd black powder. A vigorous reaction ensued. After reaction appeared complete, an additional 5.0 grams/liter of tetra sodium pyrophosphate and 2.5 grams/liter sodium hypophosphite was added to insure complete depletion of $Ni^{++}$. Twenty liters of this solution produced 100 grams of the catalyst. The flocculant precipitate is allowed to settle; and the mother liquor decanted. The product of catalystic material is then transferred to a filtering means where it is washed with water until free of waste salts.

One batch of catalyst produced from a bath such as the one just described had a P content of 5.6% and a Ni content of 94.4% by weight respectively, and a surface area of 5.16 meters$^2$/gram.

The solution, complexed and buffered, is now ready to be provided with an initiating stimulus to start the reduction of $Ni^{++}$ to $Ni^{\circ}$.

Initiation may be provoked by subjecting the solution to a temperature above 90° C.; by providing a localized excess of reducing agent; or by seeding the solution with finely divided particles that serve as catalytic nuclei for the reduction reaction. When finely divided particles are used, we find that palladium black is exceptionally suitable.

Once the oxidation reduction reaction has been initiated however, the freshly reduced catalyst material serves as its own catalyst to sustain the reaction until complete.

The precipitate of catalyst material is collected and washed with water. The phosphorus content of this catalytic material is variable. Usually, the phosphorus content of the catalyst product is within the range of 4 to 6% phosphorus by weight and most often very close to 5%, the remainder being nickel. The surface area of our catalyst prior to fabricating also is variable within the range of 0.90 to somewhat in excess of about 5.00 meters$^2$/gram.

The washed catalytic material is now ready to be shaped into a form suitable for installation into a fuel cell. Most fuel cell designs required the electrode to assume the form of a thin sheet. Other fuel cells require forms such as cylinders which too can be satisfactorily made from our material. The ultimate shape of the electrode depends not on our catalytic material but rather on the design of the individual cell.

Any suitable fabricating technique can be used to stabilize our catalyst in the desired shape, even sintering provided the catalytic material is not heated to a temperature in excess of 825 to 850° C. Heating to a higher temperature causes the nickel phosphorus phases present as alloys to begin to melt. Melting results in a decreased surface area.

Other suitable means of forming our catalyst product into a fuel cell electrode include mixing it with a binding agent such as a thermoplastic resin; for example, polytetrafluoroethylene. The catalyst resin mixture is then shaped and heated until the thermoplastic material softens slightly to thereby stabilize the electrode.

An especially desirable means of stabilizing the catalytic material into an electrode shape was found to be as follows. The catalytic material was mixed with a small amount of asbestos fiber in an aqueous slurry; for example, 40 grams of catalyst to 0.5 gram asbestos fiber in 200 ml. water.

The catalyst asbestos mixture was then poured into a Buchner funnel fitted with filter paper. The water was removed by suction, leaving a damp matte. Care was taken to assure a uniform thickness of the matte.

The matte together with the filter paper was removed from the Buchner funnel and a nickel support screen pressed lightly into the matte. This assembly was dried in a partial vacuum (25 mm. Hg) at 60° C.

When completely dry, the electrode was trimmed to size and installed as the anode in a fuel cell operated at a reactant supply pressure of 25 p.s.i.g.; hydrogen fuel; oxygen oxidant, a silver cathode; an aqueous potassium hydroxide electrolyte concentration between 35 and 40% KOH by weight and a temperature of between 87 and 95° C. At 100 amps/ft.$^2$ the cell voltage varied between 0.760 and 0.843 volt.

The embodiments of the invention in which an exclusive property or privilege is claimed are defined as follows:

1. The method of producing a catalytic fuel cell electrode comprising the steps of preparing a nickelous ion solution consisting of a dissolved nickelous salt, a dissolved alkali pyrophosphate having at least 1.00 mole of $P_2O_7^{--}$ for each 1.45 moles $Ni^{++}$; a dissolved alkali hypophosphite having in excess of 2.75 moles of $(H_2PO_2)^-$ for each 1.00 mole of $Ni^{++}$; and maintaining the pH of said solution in excess of pH 10 through addition of ammonium hydroxide, initiating reaction of said nickelous ion with the hypophosphite of said alkali hypophosphite; reducing said nickelous ion to a flocculant precipitate of catalytic material, said catalytic material consisting of a nickel phosphorus alloy; collecting the catalytic material; and fabricating the catalytic material into a fuel cell electrode.

2. The method according to claim 1 in which said reaction between nickelous ion and hypophosphite is initiated by the addition of about 0.05 gram of palladium black per liter of said solution.

3. The method according to claim 1 in which said reaction between nickelous ion and hypophosphite is initiated by heating said solution to 90° C.

4. The method of producing a catalytic fuel cell electrode comprising the steps of preparing an aqueous solution consisting essentially of water nickelous salt, and alkali hypophosphite, and a condensed nickel complexing polyphosphate in a quantity sufficient to prevent precipitation of basic nickel salts; maintaining the pH of said solution in excess of 10; initiating reaction of said nickelous ion with the hypophosphite of said alkali hypophosphite; reducing said nickelous ion to a flocculant precipitate of catalytic material consisting essentially of a nickel phosphorus alloy; collecting the catalytic material; and fabricating the catalytic material into a fuel cell electrode.

5. The method according to claim 4 in which said reaction between nickelous ion and hypophosphite is initiated by the addition of about 0.05 gram of palladium black per liter of said solution.

6. The method according to claim 4 in which said reaction between nickelous ion and hypophosphite is initiated by heating said solution to 90° C.

References Cited

UNITED STATES PATENTS

| | | | |
|---|---|---|---|
| 2,908,568 | 10/1959 | Crehan et al. | 75—119 X |
| 2,966,427 | 12/1960 | Breining | 75—170 X |
| 3,065,535 | 11/1962 | Crehan et al. | 29—484 |
| 3,147,154 | 9/1964 | Cole et al. | 148—6.3 |

OTHER REFERENCES

R. L. Smith: The Sequestration of Metals, page 1, lines 1–13, page 70, lines 1–5, page 107, lines 1–5, MacMillan Co., New York, 1959.

WINSTON A. DOUGLAS, *Primary Examiner.*

O. F. CRUTCHFIELD, *Assistant Examiner.*